United States Patent [19]

Reese et al.

[11] 4,124,367

[45] Nov. 7, 1978

[54] METHOD OF MAKING BENT LAMINATED GLASS WINDSHIELDS WITH DRILLED APERTURES

[75] Inventors: Thomas J. Reese, Sarver; James R. Mortimer, Natrona Heights; Melvin W. Tobin, New Kensington; W. Robert Gray, Jr., Natrona Heights, all of Pa.

[73] Assignee: PPG Industries, Inc., Pittsburgh, Pa.

[21] Appl. No.: 852,115

[22] Filed: Nov. 16, 1977

[51] Int. Cl.² ...................... C03B 23/02; C03C 27/12
[52] U.S. Cl. ...................................... 65/104; 65/105; 65/107; 65/112; 156/102; 156/103
[58] Field of Search .................. 56/105, 106, 107, 62, 56/56, 112, 113, 24, 104; 156/102, 103

[56] References Cited

U.S. PATENT DOCUMENTS

| | | | |
|---|---|---|---|
| 2,725,320 | 11/1955 | Atkeson et al. | 65/24 X |
| 2,932,129 | 4/1960 | Alexander et al. | 65/105 |
| 3,146,083 | 8/1964 | Barton et al. | 65/105 X |
| 3,904,460 | 9/1975 | Comperatore | 156/102 |
| 4,023,945 | 5/1977 | Boaz | 65/105 X |

FOREIGN PATENT DOCUMENTS 669,419  8/1963  Canada ................................... 156/102

*Primary Examiner*—Arthur D. Kellogg
*Attorney, Agent, or Firm*—Dennis G. Millman; Edward I. Mates

[57] ABSTRACT

A method of fabricating bent laminated safety glass windshields having at least one hole through the entire thickness thereof adjacent to but spaced entirely from the marginal edge thereof is disclosed.

8 Claims, No Drawings

METHOD OF MAKING BENT LAMINATED GLASS WINDSHIELDS WITH DRILLED APERTURES

BACKGROUND OF THE INVENTION

1. Field of the Invention

This invention relates to the fabrication of shaped laminated safety glass windshields, particularly of the type having one or more holes adjacent to but completely spaced from the marginal edge thereof. Each hole is needed to insert a shaft for a windshield wiper so that the wiper blade can operate against an outer surface of a windshield while the windshield wiper actuating device is supported within the interior of the vehicle.

In the past, the shafts for windshield wiper blades extended entirely outside the windshield. Recent efforts to improve operating efficiency of automobiles has resulted in reducing the size of automobiles. The proportional amount of glass in an automobile has increased and the space available for various automobile accessories has been compressed. Therefore, consideration has been given to extending the shafts for actuating operation of windshield wipers through apertures in the lower portion of the windshield. This raises the problem of developing a technique for making bent laminated windshields having a pair of glass sheets with aligned holes or apertures to receive the shafts therethrough.

It is well known that glass sheets that are apertured are weaker than glass sheets that are of non-perforated construction. Drilling a hole in glass weakens the glass structurally and in the past, it has been considered necessary to strengthen apertured glass sheets by thermal tempering in order to restore some of the strength lost by drilling holes through the glass. While thermal tempering improves the overall strength of glass sheets that successfully sustain the tempering treatment, drilling holes in glass causes fissures which may extend into vents, which are origins of glass breakage when the glass is chilled rapidly after being heated to its tempering temperature. Glass is notoriously weak in tension and, temporary tension stresses are established during the rapid cooling step that causes a high rate of loss during fabrication. Apertured glass sheets that survive the temporary tensile stresses during tempering develop permanent stress patterns that incorporate a compressive stress in the skin of the glass that protects an interior stressed in tension. While monolithic glass sheets that are drilled and tempered have found use in tempered automobile sidelights for automobiles and as a component laminated to undrilled glass or plastic sheets in laminated transparencies for aircraft, glass sheets drilled with apertures have never been laminated to one another to provide a bent laminated windshield with the apertures aligned through the thickness of the bent laminate after bending, to the best of our knowledge.

It is believed that the reason that such laminates have not been known prior to the present invention is because laminated glass windshields for automobiles (particularly those composed of glass sheets having a thickness per sheet not exceeding about 110 mils (2.8 millimeters), which are usually found in present day windshields, must be heated in the vicinity of the apertures to a maximum temperature not exceeding 1150° F. (621° C.) and usually is heated to a maximum temperature within the range of 1120° F. (604° C.) to 1150° F. (621° C.) in a sag bending operation at which a pair of glass sheets are aligned and bent by gravity sagging to conform to a mold. Such temperatures are insufficient to heal most fissures that form during drilling. In contrast, glass sheets to be tempered are heated to the range of 1200° F. (649° C.) to 1250° F. (677° C.), at which temperature sufficient healing of fissures takes place to reduce the number of vents produced from the fissures during the cooling step of tempering. Consequently, it was not feasible to both control the shape of drilled glass sheets and also avoid breakage during bending.

2. Description of the Prior Art

U.S. Pat. No. 3,150,950 to English indicates a method of drilling holes through tempered glass sheets by inducing temporary stress that temporarily counteracts the major portion of a permanent stress which makes drilling and edging of tempered glass very dangerous. The difficulty of establishing a temporary stress pattern has prevented this invention from being used outside the laboratory.

U.S. Pat. No. 3,231,352 to Carson and Leflet applies a stress pattern along the edge of a pair of glass sheet blanks during its bending and subsequently cuts the stressed and shaped glass along lines that have been stressed in compression so as to minimize the danger of damage to the glass edge during cutting and to obtain an edge stressed in compression after cutting.

U.S. Pat. No. 4,023,945 to Boaz discloses a technique of cutting an opening through the thickness of an apertured glass sheet and extending a relief opening from the aperture in the glass to the edge of the glass in order to relieve stresses associated with the glass during its tempering. The stresses developed during tempering of apertured glass sheets have caused considerable breakage without the stress-relief opening. The stress-relief opening is alleged to reduce the frequency of breakage during fabrication by thermal tempering, but causes a discontinuation in the marginal edge of the glass sheet, which weakens the glass edge and makes it more difficult to handle the glass sheet without causing danger to those handling the glass edges.

When glass sheets are bent for subsequent lamination, they are usually bent in pairs such as disclosed in the aforementioned U.S. Pat. No. 3,231,352 to Carson and Leflet, and then the bent sheets are assembled on opposite sides of a sheet of interlayer material and the assembly laminated.

It is well known to laminate glass sheets that have not been provided with apertures. In one method, disclosed in U.S. Pat. No. 2,948,645 to Keim, an assembly of two glass sheets and an intermediate layer of plastic is enclosed within a marginal evacuation chamber composed of a flexible channel-shaped member made of a fluid impervious material. The interfacial surfaces between the assembled two glass sheets and plastic interlayer are evacuated through the marginal evacuation chamber while heat is applied until the glass sheet is preliminarily bonded to the marginal portion of the interlayer at least. The preliminary pressing performed by the peripheral evacuation technique is accomplished while the assembly is exposed to atmospheric pressure. The peripheral evacuation chamber is removed and the glass/plastic assembly is finally laminated under elevated temperature and pressure conditions in an autoclave.

Another well known technique for laminating glass and plastic sheets involves the insertion of an assembly comprising a pair of bent sheets of matching outline and contour assembled on opposite sides of a sheet of interlayer material including one or more glass sheets, one of which glass sheets may be apertured, within a laminating bag or envelope, which is evacuated and sealed. A typical laminating bag suitable for inserting such assemblies for lamination contains an outer layer of a composition from the class consisting of condensation products of ethylene glycol and terephthalic acid and oil impervious nylon films and an inner-layer of polyethylene, which is preferably provided with an embossed inner surface. A method of using such a laminating bag to laminate glass/plastic assemblies is disclosed in U.S. Pat. No. 3,311,517 to Keslar and Rankin. The evacuated and sealed envelope is inserted within an autoclave for final lamination under elevated temperature and pressure conditions. After sufficient time of exposure to elevated temperature and pressure conditions, the bag or envelope is opened and the laminated assembly is removed.

Still another commercial method for laminating glass/plastic assemblies comprises a roller prepressing step followed by final autoclave lamination. The roller prepressing step may be performed using the roll prepressing apparatus disclosed in U.S. Pat. No. 3,351,001 to Aachio.

DESCRIPTION OF THE PRESENT INVENTION

The present invention represents a combination of steps taken in particular sequence to produce bent laminated safety glass windshields having apertures extending throughout the thickness of the assembly. The present invention uses a pair of flat glass sheets cut to outlines conforming to the outlines desired for the inner and outer glass sheets of the bent laminated windshield. One or more holes are drilled through the thickness of each flat glass sheet individually. The holes for the two flat glass sheets are preferably drilled along axes so located that corresponding holes of the sheets are aligned after shaping. For most present commercial windshield shapes, the holes imparted to the flat glass sheets may be aligned exactly from sheet to sheet to provide sufficient overlap of holes in the bent glass for practical purposes.

One cut and drilled outer flat glass sheet is assembled against one cut and drilled inner glass sheet to form a pair of glass sheets to be shaped. Parting material is applied to an interfacial surface to prevent the glass sheets from sticking together when the pair is exposed to elevated temperatures needed for gravity sag bending. The pair of glass sheets is mounted in shaping relation to a gravity sagging mold of the outline type, the glass sheets are shaped by heat-sagging to matching curvatures by heating them to the glass deformation temperature and then annealing them by controlled cooling while supported on the outline mold. Then the sheets are separated and reassembled with a sheet of plastic interlayer material therebetween. The portions of the interlayer sheet aligned with the aligned apertures in the bent glass sheets are cut and trimmed to provide apertures extending through the entire thickness of the reassembled assembly.

During the drilling of holes through the glass sheets, hollow or core-type drills are used to provide glass discs of a slightly smaller diameter than the diameter of the hole drilled through the flat glass. A typical apparatus suitable for drilling glass is disclosed in U.S. Pat. No. 2,941,338 to Santschi.

When lamination is accomplished by either the sealed bag method or one incorporating a roller prepressing step, plugs are provided for each aperture. One embodiment of plug uses the glass discs drilled from the flat glass. The glass discs are covered with a parting material of a thickness less than half the difference in diameter between the glass plugs and the apertures in the matched glass sheets and the wrapped glass plugs (wrapped in the parting material) are inserted in the aligned apertures of the bent pair of glass sheets forming part of the reassembled assembly. The plugs are held in place during the lamination of the assembly that is performed in an enclosed envelope to provide means to prevent the interlayer from flowing excessively into the apertured regions of the assembly and to protect the envelope portions facing the drilled apertures. After lamination at elevated temperature and pressure is completed, the plugs are removed and the laminated assembly is then ready for inspection, shipment and installation. Using the plugs reduces the tendency of the interlayer to extrude into the aperture and to have its thickness reduced in the region of the periphery of the apertures or holes. Such reduced thickness sometimes impairs the adhesion between the plastic interlayer and the glass sheets in the region of the periphery of the apertures or holes. As an alternative, plugs of silicone rubber or other suitable parting material that does not adhere nor react chemically with glass or plastic interlayer material may be used instead of the glass discs wrapped in the parting material.

The plugs may also be eliminated in certain cases where the assembly of bent glass sheets and plastic interlayer are laminated by a process within a frame-like marginal portion that includes the use of peripheral evacuation for the preliminary pressing step where application of vacuum by the peripheral evacuation channel to the margin of the assembly clears the marginal portion and a sufficiently wide border to provide a clear area in the region encompassing the aligned apertures. If the assembly so prepressed shows a clear area surrounding the apertures, the peripheral evacuation chamber can be removed and the assembly can be inserted in an autoclave for direct exposure to the oil or air of the autoclave at elevated temperature and pressure to produce an adequate lamination having sufficient adhesion between layers to satisfy the requirements of a good windshield without fear of undue extrusion of the interlayer into the apertures. If the vacuum applied during the peripheral evacuation preliminary pressing step is insufficient so that vacuum is lost in the vicinity of the apertured regions, masking tape applied across the opposite surfaces across the apertures is adequate to compensate for such reduction in vacuum in most cases.

Important features of the present invention are that the glass sheets are drilled while flat to insure proper positioning of the individual apertures, that the drilling is done carefully to minimize the number and severity of fissures, and that, in order to compensate for the limited maximum temperature constraints imposed on the bending step to insure adequate control of shape, the drilled bent sheets are cooled from slightly above to slightly below the glass annealing range (approximately 1100° F. to 900° F. or 593° C. to 482° C.) at a controlled rate of cooling between 1° F. and 3° F. (0.5° to 1.7° C.) per second to stress the periphery of the holes in compression while minimizing the intensity of temporary tension stresses established during cooling that tend to extend the remaining fissures into vents in the glass from the vicinity of the apertures to cause the glass to fracture during the thermal treatment incidental to bending.

Another important feature of a particular embodiment of this invention is to provide holes of sufficiently large diameter compared to the diameter of the shaft inserted therethrough that even though there is relative slippage between the glass sheets during their simultaneous shaping by sag bending as to misalign the apertures somewhat, particularly when the sheets are bent sharply, sufficient alignment remains after shaping to enable the aligned portions to receive a shaft embedded in a sleeve or grommet of a soft material such as rubber.

DESCRIPTION OF ILLUSTRATIVE EMBODIMENT

In order to appreciate the present invention, an illustrative embodiment will be described in detail. The described embodiment produced bent laminated windows with aligned apertured portions adapted to receive the shafts of windshield wipers.

A pair of glass sheets approximately 66 inches (168 cm) long and 31 inches (79 cm) wide having a nominal thickness of 100 mils (2.5 mm) composed of float glass are cut to patterns approximately 62½ inches (159 cm) long and 27 5/32 inches (70 cm) wide conforming to the outlines of the inner and outer plies of a production windshield. Each of the flat glass sheets is aligned with a template individually, which guides the positioning and movement of core drills that drill two holes of three-quarter inch (19 mm) diameter adjacent the bottom edge of the windshield in positions to be occupied by an inserted shaft of a windshield wiper. Holes are drilled by aligning the flat glass with a template conforming to the outline shape of the glass sheet and using a SUP-R-CUT (Reg. TM) core drill having an outer diameter of ¾ inch (19 mm) and a wall thickness of 42 mils (1.07 mm) that drills into the glass from one surface in one direction through approximately 70% to 80% of its thickness while the glass is rigidly clamped to a drill press table. Each drill hole is completed by drilling through the glass sheet thickness from the second surface in a direction opposite to the direction of drilling from the first surface along a line aligned with the path of the drill from the first surface. The drilled holes are located ¾ inch (19 mm) inside the longitudinal edge. One hole is located 4⅝ inches (11.74 cm) to the right side of the transverse center line and the other hole is located 22¾ inches (57.8 cm) to the left side of the transverse center line. The core drills provide two disc shaped glass plugs having a diameter of approximately 18 millimeters, slightly less than the diameter of the apertures drilled through the thickness of each glass sheet drilled.

The two glass sheets with their holes in alignment with one another are mounted on an outline bending mold having an outline shape and curved configuration in elevation corresponding to the shape desired for the windshield. The pair of glass sheets is bent while supported on the mold and separated by a suitable parting material.

The particular parting material used to prevent the glass sheets from sticking to one another during the bending operation is a finely divided refractory material such as a calcined diatomite of the type disclosed and claimed in U.S. Pat. No. 2,725,320 to Atkeson and Golightly. The parting material may be finely divided mica or silica having a preferable mesh of 1,000 to 3,000 that is usually applied in a liquid dispersion in water of about 0.5% to about 5% by weight.

The glass sheets are heated to a temperature sufficiently high for deformation and above the upper limit generally recognized for the annealing range, which is about 1050° F. or 566° C. for commercial float glass. A preferred maximum temperature for the glass shaping step at which control of bending is not lost is about 1120° F. to 1150° F. (604° C. to 621° C.), depending on the glass thickness. For sheets of 100 mil (2.5 millimeter) thickness, 1120° F. (604° C.) is adequate.

The glass sheets, while still supported on the outline bending mold, are cooled controllably to below the annealing range (about 900° F. or 482° C.) at a controlled rate, particularly through the range of 1100° F. (593° C.) to 900° F. (482° C.), at a rate sufficiently rapid to impart a zone of compressive stress around the perimeter of each hole and sufficiently slow to avoid establishing temporary tensile stress of a magnitude sufficient to cause breakage by enlarging any vents caused by drilling. This controlled rate is from 1° F. to 3° F. (0.5° C. to 1.7° C.) per second and is preferably about 80° F. (45° C.) per minute for the 200° F. (110° C.) temperature range just indicated. The temperature range through which controlled cooling takes place brackets the glass annealing range within upper and lower temperature limits approximately equally spaced from the respective upper and lower limits of the annealing range.

It is important that the apertured glass be cooled after the bending operation by controlled cooling at the controlled rate of cooling just described, preferably by a controlled cooling rate that is substantially uniform throughout the temperature range of controlled cooling, to establish a compressive stress pattern around each hole and avoid establishing a temporary tensile stress of a magnitude sufficient to extend any fissures that might be provided in the initial drilling of the flat glass into vents that accompany glass breakage. Glass sheets that are tempered after drilling have a higher frequency of breakage because rapid chilling through the annealing range imparts temporary large stresses around the periphery of the drilled hole. These temporary stresses often cause fracture of the glass where vented.

After the glass sheets are annealed, they are permitted to cool to handling temperature and then assembled on opposite sides of a sheet of plastic interlayer material, usually 15 to 30 mils (0.38 to 0.76 millimeters) thick. While not so limited, the interlayer material can be any type of commercial interlayer material such as polyvinyl acetal, more particularly plasticized polyvinyl butyral resin. Plasticized polyvinyl acetal resins have the required transparency, tensile strength and flexibility for use as windshields. Polyvinyl butyral is prepared as recited in U.S. Pat. No. 2,400,957 to Stamatoff. Conventionally, polyvinyl acetals, particularly polyvinyl butyral which is used in laminated safety glass, contains a plasticizer. Generally, the plasticizer used is a water-insoluable ester of a polybasic acid and a polyhydric alcohol. Particularly desirably plasticizers for use in the interlayer of laminated safety windshields are triethylene glycol di (2-ethyl butyrate), although other plasticizers, such as dibutyl sebacate, di (beta-butoxy-ethyl) sebacate and dioctyl phthalate, may be used.

The interlayer may also be a polyurethane. A preferred polyurethane and its method of fabrication is disclosed in U.S. Pat. No. 3,931,113 to Seeger and Kaman. The polyurethanes used as interlayer are primarily polyester urethanes having superior properties for use in safety glass windshields and are formed from a hydroxy terminated polyester of polycaprolactone, poly(butylene adipate), poly(butylene azelate) or mixtures thereof, a diol having a molecular weight less than 250, preferably 1,4-butane diol or 1,3-butane diol, and a cycloaliphatic diisocyanate. The assembly formed with two apertured glass sheets shaped by gravity sag bending and the plastic interlayer of polyurethane or polyvinyl butyral is then formed, and the plastic exposed between the aligned apertured portions is removed by cutting, thus forming an assembly to be laminated.

The assembly is subjected to a preliminary pressing step in which it is enclosed in a continuous channel-shaped member having a shape conforming to the periphery of the assembly and formed of fluid-impervious, rubbery material that provides a peripheral conduit about the assembly. The outer wall of the peripheral conduit is provided with a stem for connection to a source of vacuum, and the channel-shaped members have lips that are flexible and make strong contact with the glass.

A vacuum source of more than 25 inches (63.5 cm.) of mercury is applied to the peripheral conduit to draw out air from between the interlayer and the apertured glass sheets. Evacuation is continued while this entire assembly with the continuous channel-shaped member therearound is heated in an oven maintained at 225° F. (107° C.). The simultaneous heating and evacuation is continued for at least 20 minutes. The assembly is then removed from the oven which supplies the heat and the channel-shaped member is removed from the periphery of the laminated assembly. The windshields assembly is inspected and is satisfactorily sealed, not only in the marginal area of the assembly, but also in the region of the apertured portion.

According to one method of lamination of the assembly, after the preliminary pressing step just described, the edge of the plastic is trimmed, and a roll is rotated with its peripheral edge against the exposed plastic edge to thicken the latter against the opposite glass sheets, using the edge sealing technique of edge rolling disclosed in U.S. Pat. No. 2,999,779 to John W. Morris, the disclosure of which is incorporated herein by reference. The edge of the assembly is rendered more resistant to penetration by oil or air in an autocalve at the interfacial surfaces by applying an edge roller of spring steel in the form of a disc having a thickness of about 0.010 inch (about 0.4 millimeters) and a diameter of 2½ to 3 inches (6 to 7.5 millimeters) to interlayers of the thickness range previously mentioned.

The assemblies are finally pressed in an oil autoclave at 275° F. (135° C.) and a pressure of 200 pounds per square inch (1.4 × 10⁶ pascals) for at least 30 minutes. Assemblies that pass inspection after preliminary pressing also pass final inspection after final lamination in the autoclave.

A second pattern of laminated windshields is produced using a Permattach (Reg. TM) diamond core drill ⅞ inch (22.2 mm) in diameter having a wall thickness of 46 mils (1.07 mm) to drill holes 1 3/16 inches (30 mm) from the bottom edge of glass sheets approximately 58 inches (147 cm) long and 28 9/16 inches (72 cm) wide, one 4¼ inches (108 mm) to the right of the transverse center line and the other 22 inches (559 mm) to the left of the transverse center line. After the holes are drilled, the other steps enumerated for the first pattern is repeated with successful results.

As an alternative to the method described in detail, an assembly of bent glass and plastic is plugged at its apertures. The glass discs that were removed previously by drilling the individual glass sheets are wrapped in a thin film of a parting material such as polyvinyl fluoride (TEDLAR ®) to form plugs, if desired. The wrapped glass plugs or plugs of a parting material, such as a polyethylene glycol of terephthalic acid (MYLAR ®), are inserted in the apertured portions of the glass sheets and taped to the major surfaces. The plugged assembly is wrapped in a thin wrapping of polyvinyl fluoride sheeting 1 to 2 mils (0.025 to 0.05 mm) thick, the wrapped assembly inserted in a thin envelope of the Mylar-polyethylene type, the envelope evacuated and sealed and the envelope and its contents immersed in an oil autoclave for exposure to at least 45 minutes of elevated temperature (275° F. equivalent to 135° C.) and 200 pounds per square inch (1.4 × 10⁶ pascals) pressure with successful lamination and optics. Assemblies have been successfully laminated in the envelope using plugs in the holes. Both glass plugs covered with parting material and plugs of silicone rubber have been used in the laminating method involving the use of an envelope.

The bent laminated assemblies have the plugs removed (if plugs are used in lamination) and shafts for windshield wipers are inserted through grommets or sleeves of soft rubber or similar material. The shafts are inserted through the aligned apertures and the soft rubber sleeves conform to the holes even if there is some misalignment between corresponding holes. It is understood that in the patterns previously described, the holes are located in portions of the glass sheets of rather shallow curvature. Hence, both outer and inner glass sheets could be drilled using the same or identical templates to guide the drill locations. It is understood that for more severe bends and/or for locations spaced greater distances from the transverse center line, that different templates having different guide locations for the drills for the outer and inner glass sheets can be used to compensate for relative slippage between the sheets during shaping should such become necessary.

Flexural tests were performed to compare the strength of flat laminates composed of glass sheets drilled individually before a thermal treatment simulating the bending and cooling operation and flat laminates in which the drilling was performed after lamination. Flat laminates of float glass having a total thickness of approximately 220 mils (5.6 millimeters) containing an interlayer of polyvinyl butyral 30 miles (0.76 millimeters) thick, 12 inches (30 centimeters) long and 3 inches (7.6 centimeters) wide had apertures ¾ inch (1.9 centimeters) in diameter centrally located. A Baldwin testing machine was used to apply a load increasing at 17 pounds (7.7 Kilograms) per minute through a 5 inch (12.7 centimeter) wide beam applied over the top surface of each laminate across the aperture while the laminate was supported over 2 supports symmetrically arranged 11 inches (27.94 centimeters) apart flanking the aperture.

Seven laminates composed of individual sheets that were heat treated to simulate bending after drilling and before laminating had an average rupture of 47.6 pounds (22.5 Kilograms), whereas five laminates drilled after lamination had an average rupture strength of only 39.9 pounds (18.2 Kilograms). Therefore, it is concluded that stronger laminated bent apertured windshields result when the individual glass sheets are drilled before bending in pairs than when drilled after lamination. In addition, drilling glass sheets after bending or after bending and laminating is difficult to accomplish because of the need for shaped jigs to hold the shaped assemblies to be drilled.

This description represents a disclosure of an illustrative preferred embodiment and certain modifications of the present invention. It is understood that various changes may be made without departing from the gist of the invention as defined in the claimed subject matter that follows.

We claim

1. A method of making a bent, laminated, safety glass windshield comprising a pair of glass sheets laminated to a layer of plastic interlayer material and having at least one aperture extending through the thickness of said laminated windshield in spaced relation to a marginal portion thereof comprising performing the following steps in sequence:
    (a) drilling at least one aperture through the thickness of a first flat glass sheet,
    (b) drilling at least one corresponding aperture through the thickness of a second flat glass sheet in such a position that it will be aligned with said corresponding aperture of said first flat glass sheet after said two sheets are aligned in superimposed position and bent simultaneously,
    (c) assembling said flat glass sheets in superimposed aligned position over one another and mounting said assembly so formed over an outline bending mold of the gravity sagging type having an upward facing shaping surface conforming to the shape desired for said glass sheets,
    (d) heating said glass sheet assembly to at least the deformation temperature of the glass and not above 1150° F. (677° C.) in the vicinity of said aperture whereby the glass sheets sag to form shaped glass sheets having controlled shapes corresponding to the shaping surface of said bending mold,
    (e) cooling said shaped glass sheets, controlling said cooling in the range from about 1100° F. (593° C.) to about 900° F. (482° C.) to a rate of cooling of between 1° F. (0.5° C.) and 3° F. (1.7° C.) per second, thereby establishing a compression stress in the periphery of said holes while avoiding the establishment of temporary tension stresses in said hole periphery that would cause the glass to break in the vicinity thereof, and
    (f) laminating said shaped glass sheets to an interlayer composed of polyurethane or polyvinyl acetal.

2. The method as in claim 1, wherein said laminating is performed by reassembling said shaped glass sheets on opposite sides of a sheet of plastic interlayer material selected from the class consisting of polyurethanes and polyvinyl acetals in such a manner that the corresponding holes in the shaped glass sheets are aligned with one another to form a laminating assembly, cutting an aperture through the portion of said interlayer material that is aligned with each of said corresponding holes, closing said aperture by applying tape across the major surfaces of said assembly across the ends of said aperture, applying a vacuum to the interfacial surfaces of said assembly through a peripheral evacuating chamber, removing said tape and laminating said assembly at elevated temperature and pressure for sufficient time to bond said interlayer material to said glass sheets.

3. The method as in claim 1, comprising drilling through the thickness of each of said flat glass sheets with a core drill, thereby removing a glass disc having a smaller diameter than the diameter of each said aperture resulting from said drilling, covering said glass disc with a parting material having a thickness less than half the difference in diameter between said removed glass disc and said hole and that does not bond to said plastic interlayer material or to glass, applying said covered glass disc to said aperture and laminating said assembly.

4. The method as in claim 3, wherein said laminating assembly is laminated while inserted within a flexible, sealed envelope.

5. The method as in claim 1, wherein plugging material composed of a plug of a parting material that does not adhere to said interlayer material or glass when exposed to temperature as high as 300° F. (149° C.) and has dimensions that allow it to fit loosely within said aligned holes is applied to said aligned holes.

6. The method as in claim 5, wherein said plugging material is taped in position in said holes while the plugged assembly is subjected to said elevated temperature and pressure during said lamination.

7. A method of making a bent, laminated safety glass windshield having at least one aperture extending through the entire thickness of said windshield comprising a pair of bent glass sheets having aligned apertures and a layer of plastic interlayer material apertured in alignment with the aligned apertures in said apertured glass sheets comprising
    (1) drilling an aperture through a first flat glass sheet to be bent and laminated,
    (2) drilling a corresponding aperture through a second flat glass sheet to be bent and laminated, said aperture being in such a position that it is aligned with the corresponding aperture of said first flat glass sheet after said glass sheets are bent,
    (3) assembling said glass sheets with said apertures aligned in shaping relation to an outline bending mold of the gravity-sag type,
    (4) heating said assembled glass sheets to a temperature sufficient to sag said glass sheets simultaneously to conform to the shape of said mold but insufficient in the vicinity of said apertures to heal the more severe fissures formed during said drilling, whereby said sheets conform to the shape of said mold and said unhealed fissures in said apertured portion of the glass sheets remain susceptible of developing into vents,
    (5) cooling said shaped glass sheets at a controlled rate of cooling at a sufficiently slow and uniform rate through a temperature range from above to below the annealing range of the glass to avoid establishing temporary tension stresses that would cause said unhealed fissures to develop into vents, yet at a rate through said temperature range sufficient to establish a compression stress layer in the surface of said apertured portion, and laminating said shaped, apertured glass sheets to an interlayer composed of polyurethane or polyvinyl acetal.

8. The method as in claim 7, wherein said cooling is controlled between about 1100° F. (593° C.) and about 900° F. (482° C.) to a rate of between 1° F. (0.5° C.) and 3° F. (1.7° C.) per second.

* * * * *